United States Patent [19]

Trickle

[11] Patent Number: 5,047,748
[45] Date of Patent: Sep. 10, 1991

[54] DOCK MONITORING SYSTEM
[75] Inventor: Glen Trickle, Racine, Wis.
[73] Assignee: Rite-Hite Corporation, Milwaukee, Wis.
[21] Appl. No.: 341,531
[22] Filed: Apr. 21, 1989
[51] Int. Cl.$^5$ ............................................ E05B 41/00
[52] U.S. Cl. .................................. 340/542; 340/687; 340/942; 414/401; 70/262; 70/432
[58] Field of Search ................ 364/401; 340/542, 942, 340/825.15, 687; 70/432, 433, 262, 264; 312/215; 414/401

[56] References Cited

U.S. PATENT DOCUMENTS

| | | | |
|---|---|---|---|
| 3,969,584 | 7/1976 | Miller et al. | 340/542 X |
| 4,146,779 | 3/1979 | Osborne | 377/20 |
| 4,204,635 | 5/1980 | Hofmann et al. | 235/382 |
| 4,581,605 | 4/1986 | Vogt | 340/525 |
| 4,648,781 | 3/1987 | Sikora | 414/401 |
| 4,692,755 | 9/1987 | Hahn | 340/687 |
| 4,700,295 | 10/1987 | Katsof et al. | 364/401 |
| 4,831,374 | 5/1989 | Masel | 340/825.31 |
| 4,843,373 | 6/1989 | Trickle et al. | 340/540 |
| 4,858,120 | 8/1989 | Samuelson | 364/401 |
| 4,912,687 | 3/1990 | Treeby | 368/10 |

OTHER PUBLICATIONS

"AI-Based Gate Management System Unveiled by System One", *Air Transport World*, Nov. 1988, 74, 79.
"GADS: ES airline gate management", *AIWeek*, Feb. 1, 1988, 5.
Shifrin, Carole A., "Gate Assignment expert system reduces delays at United's Hubs", *Aviation Week & Space Technology*, vol. 128, No. 4, Jan. 25, 1988, 148-9.

*Primary Examiner*—Clark A. Jablon
*Attorney, Agent, or Firm*—Neuman, Williams, Anderson & Olson

[57] ABSTRACT

A remote monitoring system for a multi-position loading dock facility having a vehicle restraint lock at each loading/unloading position is disclosed. The monitoring system includes a data processor, and a keyboard and monitor associated therewith, which may be coupled to lock sensing switches and other signalling devices at each loading/unloading position. The data processor, supplied with the developed signals corresponding to the condition of a truck at each loading/unloading position, is operable to continually process these signals to allow display and recording of a plurality of types of data.

16 Claims, 7 Drawing Sheets

Fig. 2

RITE HITE　　　　DOK MONITOR (R)　　　　FRI APR 14 14:19:45

```
                    RITE HITE

DOK MONITOR (R) - Vehicle Monitor System

© 1989 RITE HITE CORP.
```

F1-MAIN  F2-STATUS  F3-ACTIVITY  F4-CURRENT  F5-PERIOD  F9-PRINT  F10-EXIT

Fig. 3

RITE HITE　　　　DOK MONITOR (R)　　　　FRI APR 14 14:20:34

DOK MONITOR (R) SET UP

```
        *** FOR USE BY AUTHORIZED PERSONNEL ONLY ***

*** HIT 'ESC' THEN 'F1' TO TERMINATE ***
```

ENTER PASSCODE - ******
F1-MAIN  F2-STATUS  F3-ACTIVITY  F4-CURRENT  F5-PERIOD  F9-PRINT  F10-EXIT

Fig. 4

RITE HITE      DOK MONITOR (R)      FRI APR 14 14:23:38

```
========================= DOK MONITOR (R) SET UP =========================

NUMBER OF DOCK POSITIONS: 20

DOK MONITOR (R) TYPE (1 or 2): 2

*** PROGRAM MUST BE RESTARTED IF ***
     ***     MONITOR TYPE IS CHANGED   ***

```

F1-MAIN  F2-STATUS  F3-ACTIVITY  F4-CURRENT  F5-PERIOD  F9-PRINT  F10-EXIT

Fig. 5

RITE HITE      DOK MONITOR (R)      FRI APR 14 14:25:15

```
============================== MAIN MENU ==============================

F1  - MAIN MENU
         F3  - DOCK ACTIVITY
         F4  - CURRENT DAY DOCK ACTIVITY
         F5  - PERIOD SUMMARY
         F6  -
         F7  -
         F8  -
         F9  - PRINT
         F10 - EXIT

```

F1-MAIN  F2-STATUS  F3-ACTIVITY  F4-CURRENT  F5-PERIOD  F9-PRINT  F10-EXIT

Fig. 6

RITE HITE　　　　　DOK MONITOR (R)　　　　　　　FRI APR 14 14:45:35

DOCK STATUS

| DOCK POSITION | STATUS | IN-DOOR TIME | LOAD TIME | ID / COMMENTS |
|---|---|---|---|---|
| 1 | OPEN | | | |
| 2 | TRUCK IN-DOOR | 11:34 | | |
| 3 | TRUCK LOCKED | 40:45 | 35:26 | |
| 4 | TRUCK RELEASED | 70:56 | 59:05 | |
| 5 | TRUCK IN DOOR | 5:14 | | |
| 6 | TRUCK IN DOOR | 15:31 | | |
| 7 | TRUCK IN DOOR | 17:49 | | |
| 8 | TRUCK IN DOOR | 5:12 | | |
| 9 | OPEN | | | |
| 10 | TRUCK IN DOOR | 20:22 | | |
| 11 | TRUCK LOCKED | 30:29 | 22:37 | |
| 12 | TRUCK RELEASED | 87:06 | 59:25 | |
| 13 | TRUCK IN DOOR | 21:44 | | |
| 14 | TRUCK IN DOOR | 6:56 | | |

F1-MAIN  F2-STATUS  F3-ACTIVITY  F4-CURRENT  F5-PERIOD  F9-PRINT  F10-EXIT

Fig. 7

RITE HITE　　　　　DOK MONITOR (R)　　　　　　　FRI APR 14 14:31:19

DOCK ACTIVITY

FOR DOCK POSITION: 2

| EVENT | ACTIVITY | TIME |
|---|---|---|
| 1 | TRUCK IN DOOR | 13:06 |
| 2 | TRUCK LOCKED | 13:17 |
| 3 | TRUCK RELEASED | 14:29 |
| 4 | OPEN | 14:32 |
| 5 | TRUCK IN DOOR | 14:40 |

F1-MAIN  F2-STATUS  F3-ACTIVITY  F4-CURRENT  F5-PERIOD  F9-PRINT  F10-EXIT

Fig. 8

RITE HITE    DOK MONITOR (R)                    FRI APR 14 14:26:17

========================= CURRENT DAY DOCK REPORT =========================

| DOCK POSITION | TOTAL IN DOOR TIME | TOTAL LOAD TIME | |
|---|---|---|---|
| | | | SUMMARY DATE: 04/14/89 |
| 1 | 450:45 | 336:26 | ACTIVITY HOURS: 8.75 |
| 2 | 476:28 | 385:52 | |
| 3 | 497:14 | 372:44 | |
| 4 | 466:57 | 345:28 | |
| 5 | 501:43 | 416:36 | |
| 6 | 478:20 | 401:00 | |
| 7 | 475:47 | 360:24 | |
| 8 | 486:48 | 398:42 | |
| 9 | 481:56 | 388:57 | |
| 10 | 460:25 | 365:48 | |
| 11 | 471:36 | 378:29 | |
| 12 | 488:26 | 371:48 | |
| 13 | 490:45 | 394:04 | |
| 14 | 465:19 | 358:49 | |

F1-MAIN  F2-STATUS  F3-ACTIVITY  F4-CURRENT  F5-PERIOD  F9-PRINT  F10-EXIT

Fig. 9

RITE HITE    DOK MONITOR (R)                    FRI APR 14 14:29:22

========================= PERIOD SUMMARY DOCK REPORT =========================

| DOCK POSITION | TOTAL IN DOOR TIME | TOTAL LOAD TIME | |
|---|---|---|---|
| | | | SUMMARY DATE: 04/12/89 -04/13/89 |
| 1 | 1650:34 | 1104:54 | ACTIVITY HOURS: 24.00 |
| 2 | 1798:02 | 1365:38 | |
| 3 | 2004:29 | 1497:34 | |
| 4 | 1698:18 | 1248:06 | |
| 5 | 1996:45 | 1536:27 | |
| 6 | 1867:26 | 1365:29 | |
| 7 | 1888:22 | 1463:18 | |
| 8 | 1765:35 | 1395:21 | |
| 9 | 1176:45 | 894:52 | |
| 10 | 1775:31 | 1285:37 | |
| 11 | 1867:49 | 1403:51 | |
| 12 | 1668:36 | 1165:48 | |
| 13 | 1902:15 | 1332:23 | |
| 14 | 1835:55 | 1308:59 | |

F1-MAIN  F2-STATUS  F3-ACTIVITY  F4-CURRENT  F5-PERIOD  F9-PRINT  F10-EXIT

Fig. 10

RITE HITE　　　　　DOK MONITOR (R)　　　　　　　FRI APR 14 14:43:07

============ DOK MONITOR (R) SET UP ============

NUMBER OF DOCK POSITIONS: 40

DOK MONITOR (R) TYPE (1 or 2): 1

* PROGRAM MUST BE RESTARTED IF *
　　　　*　　MONITOR TYPE IS CHANGED　　*

F1-MAIN  F2-STATUS  F3-ACTIVITY  F4-CURRENT  F5-PERIOD  F9-PRINT  F10-EXIT

Fig. 11

RITE HITE　　　　　DOK MONITOR (R)　　　　　　　FRI APR 14 14:45:13

================ DOCK STATUS ================

| DOCK POSITION | STATUS | LOAD TIME | ID / COMMENTS |
|---|---|---|---|
| 1 | OPEN | | |
| 2 | TRUCK LOCKED | 35:53 | |
| 3 | TRUCK LOCKED | 12:06 | |
| 4 | OPEN | | |
| 5 | OPEN | | |
| 6 | TRUCK LOCKED | 46:89 | |
| 7 | OPEN | | |
| 8 | OPEN | | |
| 9 | OPEN | | |
| 10 | TRUCK LOCKED | 67:25 | |
| 11 | OPEN | | |
| 12 | OPEN | | |
| 13 | TRUCK LOCKED | 22:57 | |
| 14 | TRUCK LOCKED | 59:26 | |

F1-MAIN  F2-STATUS  F3-ACTIVITY  F4-CURRENT  F5-PERIOD  F9-PRINT  F10-EXIT

Fig. 12

RITE HITE DOK MONITOR (R) FRI APR 14 14:50:06

CURRENT DAY DOCK REPORT

| DOCK POSITION | TOTAL LOAD TIME |
|---|---|
| 1 | 336:26 |
| 2 | 385:52 |
| 3 | 372:44 |
| 4 | 345:28 |
| 5 | 416:36 |
| 6 | 401:00 |
| 7 | 360:24 |
| 8 | 398:42 |
| 9 | 388:57 |
| 10 | 365:48 |
| 11 | 378:29 |
| 12 | 371:48 |
| 13 | 394:04 |
| 14 | 358:49 |

SUMMARY DATE: 04/14/89
ACTIVITY HOURS: 8.75

F1-MAIN F2-STATUS F3-ACTIVITY F4-CURRENT F5-PERIOD F9-PRINT F10-EXIT

Fig. 13

RITE HITE DOK MONITOR (R) FRI APR 14 14:52:58

PERIOD SUMMARY DOCK REPORT

| DOCK POSITION | TOTAL LOAD TIME |
|---|---|
| 1 | 1104:54 |
| 2 | 1365:38 |
| 3 | 1497:34 |
| 4 | 1248:06 |
| 5 | 1536:27 |
| 6 | 1365:29 |
| 7 | 1463:18 |
| 8 | 1395:21 |
| 9 | 894:52 |
| 10 | 1285:37 |
| 11 | 1403:51 |
| 12 | 1165:48 |
| 13 | 1332:59 |
| 14 | 1308:59 |

SUMMARY DATE:
 04/12/89 -04/13/89
ACTIVITY HOURS: 24.00

F1-MAIN F2-STATUS F3-ACTIVITY F4-CURRENT F5-PERIOD F9-PRINT F10-EXIT

DOCK MONITORING SYSTEM

COPYRIGHT

A portion of the disclosure of this patent document contains material which is subject to copyright protection. The owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to a dock monitoring system and more particularly to a monitoring system for monitoring operations at a truck docking facility to obtain improved safety and traffic control, facilitate scheduling and planning and obtain increases in productivity and utilization of capital investment. The system of the invention is inexpensive, readily placed in operation, is easy to use and provides permanent records of operations.

2. Background of the Prior Art

Systems have heretofore been provided for controlling operations and indicating operations at truck docking facilities. The Hahn U.S. Pat. No. 4,692,755 discloses a system in which signal lights are provided on the inside and outside of a dock facility to give dock personnel and truck drivers clearly visible indications of when it is safe or unsafe to load or unload a truck or to park or remove a truck, and to provide other safety features. An improvement of the system of the Hahn Patent is disclosed in an application of Glenn Trickle and Michael A. Swessel, U.S. Ser. No. 131,196, filed Dec. 10, 1987, now U.S. Pat. No. 4,843,373, the disclosure of which is incorporated by reference. This application issued as U.S. Pat. No. 4,843,373 on June 27, 1989. The system of Trickle U.S. Pat. No. 4,843,373 includes a programmable control unit which is versatile and provides various safe and reliable modes of operation, being also operable to perform diagnostic operations. These systems have produced increased safety and efficiency in loading and unloading operations with the result that problems and the possibilities for other improvements have not been recognized.

SUMMARY OF THE INVENTION

This invention was evolved with the general object of obtaining improved safety and efficiency in operations of truck docking facilities, while reducing costs and increasing productivity.

An important aspect of the invention relates to the discovery and recognition of problems with existing systems, particularly with respect to safety and efficiency problems which occur in many systems, especially in systems in which there are a large number of truck loading/unloading positions. It is found that problems in such systems frequently occur because supervisory control is exercised only to a limited extent so that, to a large extent, the movement of trucks into and out of loading/unloading positions and the actual loading/unloading operations are left up to the truck drivers and dock personnel. It is further found that supervisory control is not exercised to any greater extent because it is usually not easy to see and keep close track of what is going on in a multi-position facility and it would seemingly be unduly expensive and inefficient to spend a greater amount of relatively expensive supervisory time. In addition, it is found that safety problems can result, such as, for example, when trucks are so positioned as to obstruct traffic or when truck drivers are competing with one another to be in a position to move his or her truck into the next position to be vacated.

In accordance with this invention, a monitoring system is provided for installation at a multi-position docking facility which includes a locking device at each position for restraining a truck against movement during loading/unloading operations. The system is relatively inexpensive but permits a controller or dispatcher at a multi-position truck docking facility to easily and instantaneously obtain information as to the current status of the locking device at each truck unloading position and, in addition, to obtain information as to the length of time that each operated lock device has been in its locked condition.

The immediate availability of such information has many advantages. For example, when the facility is being operated at near full capacity, the system allows a dispatcher to ascertain which position is likely to be the next to be available and to alert the drivers of incoming trucks to be ready to move into the position.

Information from each loading position on the dock is received from sensing devices located in each position. Each time a change occurs in the status of any one of the positions, the change is recorded so that over time a picture of the comings and goings as a whole is built up. Such information is usable on a day to day basis and is also accumulated over longer periods.

On a day to day basis, the system allows dispatchers to ascertain which position is likely to be available next and is highly advantageous for obtaining efficient and safe control of traffic at a dock facility. It is also very beneficial in indicating where there are areas of trouble. A dispatcher is enabled to quickly notice positions where a truck is taking an unusually long time loading or unloading and may be able to go to assist. In addition, data accumulated over longer periods is useful in determining the efficiency of a dock facility as well as highlighting areas in which improvements could be made.

In accordance with important features of the invention, the system comprises a data processor, preferably a standard type of personal computer and associated keyboard and monitor available commercially at relatively low cost. The data processor is operable by a keyboard and is adapted to receive signals placed in each of the loading/unloading positions of a loading dock facility. The sensors coupled to the data processor include lock condition sensing means for developing locked and unlocked signals respectively corresponding to the locked and unlocked condition of a truck at each of the positions.

The data processor is operable to continually process signals from the lock condition sensing means and includes a display screen to enable a plurality of types of data to be displayed. The types of data available include the current lock condition data which shows the current status of each of the lock conditioning means and the load time data showing the time of development of each locked signal.

The data processor is so arranged that it may also be coupled to truck sensing means for developing empty and in-door signals corresponding to the existence or otherwise of a truck in each of the loading/unloading positions. In this case the data processor is operable to continually process signals from the truck sensing means to display data on the monitoring screen which shows the status of the empty and indoor signals for each position and the time of development of each signal. The data processing means may preferably additionally include selection means to enable data received from both the lock condition sensing means and the truck sensing means to be displayed or just the data from the lock condition sensing means.

The monitoring system also includes means adapted to record data for each event that occurs in each of the positions of the loading dock. The system records each change of status in the dock, for example, a change between an in-door condition and an empty condition or a change between a locked condition and an unlocked condition. Data recorded in this manner is permanently or temporarily stored to enable condensed files and summaries over specified periods of time to be produced.

Other objects, features and advantages will become more fully apparent from the following detailed description taken in conjunction with the accompanying drawings.

BRIEF DESCRIPTION OF THE DRAWINGS

FIGS. 2-13 show screens produced by the monitor of the system during various conditions of operation.

DESCRIPTION OF A PREFERRED EMBODIMENT

Figure 1:
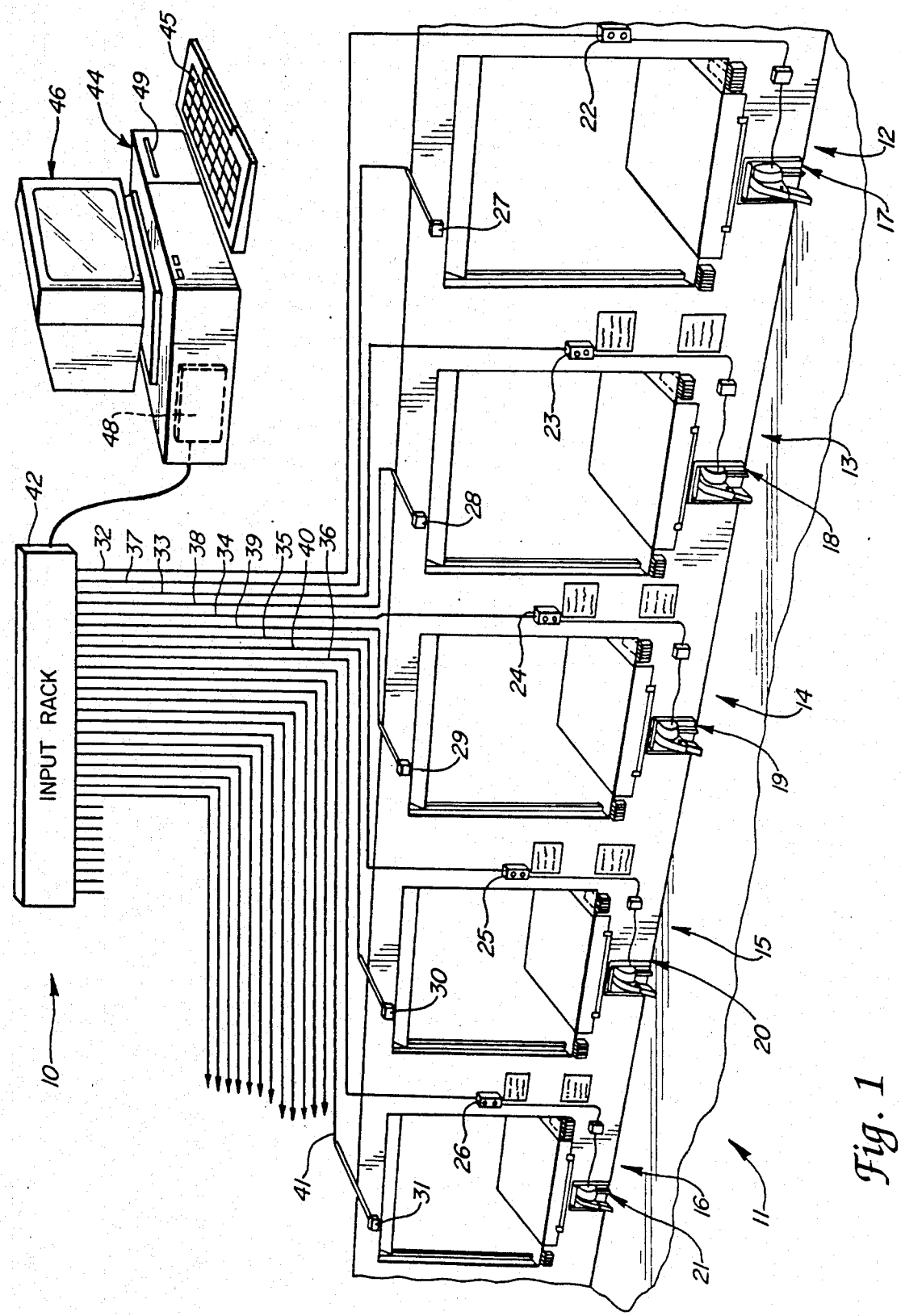
FIG. 1 diagrammatically illustrates a dock monitoring system of the invention which includes a computer having a monitor connected thereto, the system being shown connected to a portion of a docking facility which is shown in perspective.

In FIG. 1, reference numeral 10 generally designates a dock monitoring system constructed in accordance with the principles of the invention. As diagrammatically illustrated the system 10 is connectable to components of a multi-position dock facility 11. Five loading/unloading positions 12-16 are illustrated, but it will be understood that many more loading/unloading positions may be monitored with the system 10. A locking device is provided at each position, five locking devices 17-21 being shown, each being arranged to engage a standard type of bumper which includes a transverse horizontal bar at the rear of a truck or trailer. The bumper is required by I.C.C. regulations and is commonly referred to as an "ICC" bar.

The locking devices of the facility 11 are connected to a control and signal system which is preferably constructed as shown in the aforementioned Trickle et al. and which includes five outside light units 22-26 for the five illustrated locking devices 17-21, each of the light units having red and green lights for signalling to a truck driver whether it is unsafe or safe to back into the associated loading/unloading position. The control and signal system also includes a control box and signal lights on the inside of each position and, in addition, may preferably include at each position an outside photoelectric sensor device for sensing whether or not a truck or trailer is positioned at the dock, five such photoelectric sensor devices 27-31 being shown. Switches which are mechanically operated by a vehicle or other means may optionally be used instead of photoelectric sensor devices 27-31 to detect the presence of a vehicle at each position.

The control circuitry for each loading/unloading position is arranged to develop a lock condition signal corresponding to the condition of the associated locking device and as diagrammatically shown, such lock condition signals for the five illustrated loading/unloading positions are applied to the monitoring system 10 through five signal lines 32-36. In addition, signals developed from the photoelectric sensor devices 27-31 and corresponding to the presence or absence of vehicles at the five illustrated loading/unloading positions are applied through the system 10 through signal lines 37-41.

The signal lines 32-41 and those for other loading/unloading positions of the facility 11 are connected to an input rack 42 which is connected to a computer 44. Computer 44 is preferably a standard type of personal computer such as an IBM PC or compatible and, as shown, is connected to a keyboard 45 and monitor 46, both of which may be of standard types. The input rack 42 preferably includes opto-isolators circuits which provide protective isolation and which develop signals at low voltage levels compatible with the computer 44 from signals which are supplied through the signal lines 32-41 and which may be higher voltage AC signals. The input rack 42 is connected to a standard type of interface card 48 which may be installed in a slot of the computer, as indicated in dotted lines.

The system 10 is preferably placed in operation by installing an operating program in the computer 44 using an object program which may be on a disk inserted in a standard slot 49 of the computer 44 or which may be permanently stored on a hard disc of the computer 44. A source program listing for the operating object program is provided in Appendix A. This program is written in the well-known "C" programming language and its operation will be evident from the source program listing and included explanatory comments.

The overall operation will be clarified by consideration of the screens produced on the monitor 46 in various modes of operation, such screens being shown in FIGS. 2-13.

FIG. 2 shows the start up screen for the vehicle monitor system. On typing any one of the commands F2 through F10 the set up screen shown in FIG. 3 will appear. To move further into the system the correct passcode must be entered, although the main menu may be viewed without entering the passcode. This system guards against unauthorized access to the information held. On correct entry of the passcode a further set up screen shown in FIG. 4 will appear. This enables the operator to select between monitor types 1 and 2. In FIG. 4, type 2 is selected, which means that the monitoring system from which data is being received has both lock condition and truck sensors and the system must be set to process the data accordingly. The message at the bottom of the screen warns that the program must be restarted if the type of dock monitor is changed.

The set up screen of FIG. 4 also provides for the number of dock positions in the facility to be entered. In the example of FIG. 4 the number is 20. Screens which are illustrated in subsequent figures of the drawings show only display data for the first 14, but data for the remaining may be viewed through the use of cursor control keys of the computer 44.

On each of the illustrated screens a summary of the functions of the various function keys is given along the bottom of the screen for ready access from one screen to another. More detailed functions are available on pressing F1 to reveal the main menu shown in FIG. 5. The menu lists the types of information available.

Hitting the function key F2 gives a dock status report such as that shown in FIG. 6. This gives information on the current situation in each of the loading positions and also indicates the length of time that each position has been in its present state. The indoor time indicates the length of time that has elapsed since the truck currently in each of the occupied positions first entered that position. The in-door time is only given for those positions that are actually occupied at the time of the report. Similarly the load time is only given for those positions in which the truck is locked for loading or unloading. The load time recorded for all positions that are still in the locked position will be loading times to date. The loading times for those trucks that are released, such as in positions 4 and 12 will be for completion of the entire operation.

By returning to the main menu (FIG. 5) other options can be seen. Entering F3 will give a dock activity report such as that shown in FIG. 7; F4 will give a current day dock report shown in FIG. 8; and F5 will display a period summary dock report such as that shown in FIG. 9. The other options F9 and F10 allow the operator to print out a hard copy of the report accessed, or exit the system, respectively.

When the function key F3 is depressed, the dock activity screen of FIG. 7 is accessed. This provides information on a series of events that have occurred in a specified dock. Upon initially accessing the screen of FIG. 9, a prompt appears after "FOR DOCK POSITION:", signalling the operator for entry of the number of the dock position for which activity information is desired. Then a listing of a series of the most recently occurring events will appear, as shown, providing information as to the type of each event and the time at which it occurred. In FIG. 7 the preceding five events are listed and the times at which these occurred. This operation provides very useful information, in making it possible to readily determine how long an unoccupied dock has been vacated and in allowing the operator to look back to see whether there is likely to be a problem with a particular dock.

FIG. 8 shows a current day dock report screen which is produced in response to pressing the F4 function key. This report provides information on the total time that each of the dock positions has been occupied that day and the total time for each of the positions that occupying trucks were in locked condition for unloading.

The period summary report shown in FIG. 9 provides the same information as the current day report of FIG. 8 but for a specified period. This period again can be designated by the operator to include the number of days required.

FIG. 10 is a set up screen like that of FIG. 4, differing in that the dock monitor type 1 is selected and also in that there are 40 dock positions entered, rather than 20. FIGS. 11-13 show reports which are produced with the set up of FIG. 10. These are similar to those shown in FIGS. 6-9 but differ in that instead of both loading times and in-door times being displayed, only load times are given. These are the types of report available to dock monitoring systems having the lock condition sensors alone.

To produce the various screens as described, the system operates to periodically scan the status of all input signals. Following each scan, data obtained as to the current status is compared with data stored during the next prior scan, to determine whether an event, i.e., a change of status, has occurred. Then the current status data is stored for comparison with the data obtained in the next scan. Data as to each event is stored in the computer memory, in a format indicating the time at which it occurred and the nature of the event. Preferably, such event data is stored in a file on a disk of the computer, in addition to being stored in the volatile memory of the computer 44.

When the operator presses a function key to obtain any one of the illustrated report screens, the system processes such stored event data to develop the present status indications, history of events and accumulated time data as required. The system is also operative to process the stored event data to generate data in a condensed file format for permanent storage of the generated data and for permitting analyses to improve the efficiency of the dock operations.

It will be understood that modifications may be effected. For example, with a computer having a color monitor, status information may be displayed in different colors. The system may also be readily modified and extended for display of information in addition to that shown, which may be obtained from additional sensors or from manual entries by the operator. These and other modifications and variations may be made without departing from the spirit and scope of the novel concepts of the invention.

APPENDIX A

```
/* MON1.c */
/* RITE HITE  -DOK MONITOR (R) system    4/18/89 */

/* COPYRIGHT 1989 BY RITE HITE */ include <graph.h>
include <conio.h>
#include <math.h>
#include <time.h>
#include <stdio.h>
#include <stdlib.h>

/*************** VARIABLE DECLARATIONS & DEFINITIONS ********************/
#define TRUE   1
#define FALSE  0
```

```c
#define F01 0x3b        /* keyboard definitions */
#define F02 0x3c
#define F03 0x3d
#define F04 0x3e
#define F05 0x3f
#define F06 0x40
#define F07 0x41
#define F08 0x42
#define F09 0x43
#define F10 0x44
#define PgUp 0x49
#define PgDn 0x51
#define AltF1 0x68
define A 0x41 char id[20][15][30];
char dokpos[] = "  ";
char sumdate[2][9] =
    {
        ("        "),
        ("        "),
    };
char password[] = "      ";
char docks[2][4] =
    {
        ("   "),
        ("   "),
    };

char prompt1[] = "     ENTER ID / COMMENTS -";
char prompt2[] = "     ENTER DOCK POSITION -";
char prompt3[2][30] =
    {
        ("ENTER START DATE MM/DD/YY -"),
        (" ENTER END DATE MM/DD/YY -"),
    };
char prompt4[] = "         ENTER PASSCODE -";
char prompt5[] = "ENTER # OF DOCK POSITIONS-";
char prompt6[] = "      ENTER MONITOR TYPE -";

char idclear[] = "                          ";
char posclear[] = "    ";
char dateclear[] = "         ";
char passclear[] = "      ";
char quantclear[] = "   ";
unsigned int yPos[16] = { 8,9,10,11,12,13,14,15,16,17,18,19,20,21,22 };

char mainmenu[] = " MAIN MENU ";                    /* menu headings */
char dockstat[] = " DOCK STATUS ";
char dockact[]  = " DOCK ACTIVITY ";
char dockrep1[] = " CURRENT DAY DOCK REPORT ";
char dockrep2[] = " PREVIOUS DAY DOCK REPORT ";
char dockrep3[] = " PERIOD SUMMARY DOCK REPORT ";
char setupscn[] = " DOK MONITOR (R) SET UP ";

char buffer[5];

double dockQty;
unsigned int dockLo;
unsigned int dockHi;
double eventQty;
extern int events;
unsigned int eventLo;
unsigned int eventHi;
unsigned int evntpgQty;
unsigned int pageQty;
unsigned int page;
unsigned int reportpgQty;

unsigned int scnNumb;
unsigned int editFlag;
```

```c
    unsigned int edchar;
    char edbuf[30];
unsigned int key;
    unsigned int row,column;
    unsigned int delay;
    unsigned int x;
    unsigned int y;
int x1,x2;
    unsigned int setFlag;
    unsigned int montype;
    unsigned int chn;
    unsigned int chnQty;
int dokbit[120];
    int doknum[150];
    int doktime[150];
    int doktype[150];
    int locset[120];
int inset[120];
    int loctot[120];
    int intot[120];
    int totalLT[140];
    int totalIDT[140];
int actstart;
    int actend;
    int actmin;
    float acthr;
    unsigned int extrapage;

extern int mintime;
    extern unsigned int retFlag;
    extern unsigned int statusFlag;

/************ PROCEDURE DEFINITIONS **************************************/ main()
    {
        unsigned int quit=FALSE;
        double n, x, xx, y;

.©1989 RITE HITE CORPORATION scrn0();
        scnNumb = 0;

rsetup();                           /* read dockQty & montype from file */
        dockQty = atof(docks[0]);
        pageQty = ceil(dockQty / 14);
        montype = atoi(docks[1]);
        chnQty  = dockQty * montype;

x = dockQty / 14;                   /* calculate space for %utilization display */
        xx = modf(x,&n);
        y = 14.0 - (14.0 * xx);
        if (xx == 0)
                y = 0;
        extrapage = FALSE;
        if (y < 2.9999)
                {
                    reportpgQty = pageQty + 1;
                    extrapage = TRUE;
                }
        else if (y >= 2.9999)
                reportpgQty = pageQty;

dockLo = 1;
        dockHi = 15;
        page = 1;

events = 0;
```

```
                eventLo = 1;
                eventHi = 14;

initdvr();                          /* configure board for digital inputs */ setfilname();

while (!quit)           /* main loop */
                    {
                    dsplyDT();
                    if (keyChk(&key))
                        {
                        keyRd();
                        if (editFlag)
                            edit();
                        else
                            kbcheck();
                        }
                    if (setFlag)
                        setup();
                    dokmon();
                    status();
                    }
            _setvideomode(_DEFAULTMODE);
        } kbcheck()       /* keyboard processing routine */
    {
        if ((key & 0xFF) == 0)
            {
            /* extended key codes */
            key = key >> 8;
            switch (key)
                {
                case F01:
                    scnNumb = 1;
```

© 1989 RITE HITE CORPORATION

```
                            _settextwindow(3,1,24,80);
                            _clearscreen(_GWINDOW);
                            drawtextbox(4,1,23,80,7,mainmenu);
                            _settextcolor(15);
                            _settextwindow(4,2,24,79);
                            scrn1txt();
                            break;
                    case F02:
                            scnNumb = 2;
                            statusFlag = 1;
                            dockLo = 1;
                            dockHi = 15;
                            page = 1;
                            _settextwindow(3,1,24,80);
                            _clearscreen(_GWINDOW);
                            drawtextbox(4,1,23,80,7,dockstat);
                            if (montype == 1)
                                    scrn2Atxt();
                            else if (montype == 2)
                                    scrn2txt();
                            docktxt();
                            setupval(page);
                            break;
                    case F03:
                            scnNumb = 3;
                            page = 1;
                            _settextwindow(3,1,24,80);
                            _clearscreen(_GWINDOW);
                            drawtextbox(4,1,23,80,7,dockact);
                            scrn3txt();
                            strcpy(dokpos,posclear);
```

```
                        editFlag = TRUE;
                        edit();
                        break;
                case F04:
                        scnNumb = 4;
                        dockLo = 1;
                        dockHi = 15;
                        page = 1;
                        _settextwindow(3,1,24,80);
                        _clearscreen(_GWINDOW);
                        drawtextbox(4,1,23,80,7,dockrep1);
                        if (montype == 1)
                                scrn4Atxt();
                        else if (montype == 2)
                                scrn4txt();
                        dsply0();
                        getmin();
                        actend = mintime;
                        actmin = actend - actstart;
                        acthr = actmin / 60.0;
                        _settextcolor(15);
                        _settextposition(3,67);
                        sprintf(buffer,"%2.1f",acthr);
                        _outtext(buffer);
                        docktxt();
                        report();
                        if (reportpgQty == 1)
                                utildisp();
                        break;
                case F05:
                        scnNumb = 6;
                        dockLo = 1;
                        dockHi = 15;
                        page = 1;
                        retFlag = 0;
                        _settextwindow(3,1,24,80);
```

©1989 RITE HITE CORPORATION

```
                        _clearscreen(_GWINDOW);
                        drawtextbox(4,1,23,80,7,dockrep3);
                        if (montype == 1)
                                scrn4Atxt();
                        else if (montype == 2)
                                scrn4txt();
                        strcpy(sumdate[0],dateclear);
                        strcpy(sumdate[1],dateclear);
                        docktxt();
                        editFlag = TRUE;
                        edit();
                        break;
                case F09:
                        scnNumb = 9;
                        break;
                case F10:
                        _setvideomode(_DEFAULTMODE);
                        exit(0);
                case PgUp:
        if (page==1 || scnNumb==0 || scnNumb==1 || scnNumb==9 || scnNumb==10 || scnNumb==11)
                        break;
                        if (scnNumb == 2)
                                {
                                statusFlag = 1;
                                if (page == pageQty)
                                        {
                                        x1 = pageQty*14 - dockQty;
                                        x2 = 14 - x1;
                                        dockHi -= x2;
                                        }
                                else
                                        dockHi -= 14;
```

```
                                page--;
                                dockLo -= 14;
                                docktxt();
                                if (scnNumb == 2)
                                        setupval(page);
                                if (scnNumb == 4)
                                        report();
                                break;
                                }
                        else if (scnNumb == 3)
                                {
                                page--;
                                activity();
                                displayact();
                                break;
                                }
                        else if (scnNumb == 4 || scnNumb == 6)
                                {
                                if (extrapage == FALSE)
                                        {
                                        if (page == pageQty)
                                                {
                                                x1 = pageQty*14 - dockQty;
                                                x2 = 14 - x1;
                                                dockHi -= x2;
                                                }
                                        else
                                                dockHi -= 14;
                                        page--;
                                        dockLo -= 14;
                                        docktxt();
                                        report();
                                        }
                                else if (extrapage == TRUE)
                                        {
```

©1989 RITE HITE CORPORATION

```
                                        if (page == reportpgQty)
                                                {
                                                dockLo = (14 * (pageQty - 1)) + 1;
                                                dockHi = dockQty + 1;
                                                }
                                        else if (page == pageQty)
                                                {
                                                x1 = pageQty*14 - dockQty;
                                                x2 = 14 - x1;
                                                dockHi -= x2;
                                                dockLo -= 14;
                                                }
                                        else
                                                {
                                                dockLo -= 14;
                                                dockHi -= 14;
                                                }
                                        page--;
                                        docktxt();
                                        report();
                                        }
                                break;
                                }
                        break;
                case PgDn:
                        if (scnNumb==0 || scnNumb==1 || scnNumb==9 || scnNumb==10 || scnNumb==11)
                                break;
                        else if (scnNumb==2 && page==pageQty)
                                break;
                        else if (scnNumb==3 && page==evntpgQty)
                                break;
                        else if (scnNumb==4 && page==reportpgQty)
                                break;
                        else if (scnNumb==6 && page==reportpgQty)
                                break;
```

```
                        page++;
                        if (scnNumb == 2)
                                {
                                statusFlag = 1;
                                if (page == pageQty)
                                        dockHi = dockQty+1;
                                else
                                        dockHi += 14;
                                dockLo += 14;
                                docktxt();
                                if (scnNumb == 2)
                                        setupval(page);
                                break;
                                }
                        else if (scnNumb == 3)
                                {
                                activity();
                                displayact();
                                break;
                                }
                        else if (scnNumb == 4 || scnNumb == 6)
                                {
                                if (extrapage == FALSE)
                                        {
                                        if (page == reportpgQty)
                                                dockHi = dockQty+1;
                                        else
                                                dockHi += 14;
                                        dockLo += 14;
                                        docktxt();
                                        report();
                                        if (page == reportpgQty)
```

©1989 RITE HITE CORPORATION

```
                                                utildisp();
                                        }
                                else if (extrapage == TRUE)
                                        {
                                        if (page == reportpgQty)
                                                {
                                                _settextwindow(9,2,22,79);
                                                _clearscreen(_GWINDOW);
                                                _settextcolor(15);
                                                report();
                                                utildisp();
                                                }
                                        else
                                                {
                                                if (page == pageQty)
                                                        dockHi = dockQty + 1;
                                                else
                                                        dockHi += 14;
                                                dockLo += 14;
                                                docktxt();
                                                report();
                                                }
                                        }
                                }
                        break;
                case AltF1:
                        if (scnNumb == 1)
                                {
                                scnNumb = 10;
                                _settextwindow(3,1,24,80);
                                _clearscreen(_GWINDOW);
                                drawtextbox(4,1,23,80,7,setupscn);
                                scrn10txt();
                                editFlag = TRUE;
                                edit();
                                }
```

```
                                break;
                        default:
                                printf("\a");
                                break;
                }
        else
                {
                /* normal key codes */
                key = key & 0xFF;
                switch (key)
                        {
                        case A:         /* Add ID/COMMENTS (screen 2 only) */
                                if(scnNumb == 2)
                                        {
                                        editFlag = TRUE;
                                        edit();
                                        }
                                else
                                        printf("\a");
                                break;
                        default:
                                printf("\a");
                                break;
                        }
                }
} scrn0()         /* initial title screen */

©1989 RITE HITE CORPORATION
0{
        _setvideomode(_TEXTC80);
        _settextwindow(1,1,25,80);
        _settextcolor(6);
        for (column=1,row=2; column<=80; column++)
                {
                _settextposition(row,column);
                _outtext("\x0CD");
                }
        _settextcolor(14);
        _settextposition(1,1);    _outtext("RITE HITE      DOK MONITOR (R)");
        _settextcolor(7);
        _settextposition(25,6);

_outtext("F1-MAIN F2-STATUS F3-ACTIVITY F4-CURRENT F5-PERIOD F9-PRINT F10-EXIT");

_settextwindow(3,1,22,80);
        _clearscreen(_GWINDOW);
        _settextcolor(15);
        _settextposition( 6,35);  _outtext("RITE HITE");
        _settextposition( 8,21);  _outtext("DOK MONITOR (R)- Vehicle Monitor System");
        _settextposition(18,22);  _outtext("software by: ABLER DATA SYSTEMS, INC.");
        return;
} scrn1txt()      /* main menu screen */
{
        _settextposition( 4, 26); _outtext("F1 - MAIN MENU");
        _settextposition( 5, 26); _outtext("F2 - DOCK STATUS");
        _settextposition( 6, 26); _outtext("F3 - DOCK ACTIVITY");
        _settextposition( 7, 26); _outtext("F4 - CURRENT DAY DOCK REPORT");
        _settextposition( 8, 26); _outtext("F5 - PERIOD SUMMARY DOCK REPORT");
        _settextposition( 9, 26); _outtext("F6 -");
        _settextposition(10, 26); _outtext("F7 -");
        _settextposition(11, 26); _outtext("F8 -");
        _settextposition(12, 26); _outtext("F9 - PRINT");
        _settextposition(13, 26); _outtext("F10- EXIT PROGRAM");
        return;
```

```
scrn2Atxt()        /* dock status screen (montype 1)*/
{
        _settextcolor(11);
        _settextposition( 1, 7); _outtext("DOCK");
        _settextposition( 2, 5); _outtext("POSITION");

_settextposition( 2,20); _outtext("STATUS");

_settextposition( 1,48); _outtext("LOAD");
        _settextposition( 2,48); _outtext("TIME");

_settextposition( 1,62); _outtext("ID /");
        _settextposition( 2,60); _outtext("COMMENTS");

for (x=4; x<74; x++)
                {
                _settextposition(3,x);
                _outtext("-");
                }
        return;
} scrn2txt()         /* dock status screen (montype 2)*/
{
        _settextcolor(11);
        _settextposition( 1, 7); _outtext("DOCK");
        _settextposition( 2, 5); _outtext("POSITION");

_settextposition( 2,20); _outtext("STATUS");

_settextposition( 1,35); _outtext("IN DOOR");
        _settextposition( 2,37); _outtext("TIME");

_settextposition( 1,48); _outtext("LOAD");
        _settextposition( 2,48); _outtext("TIME");

_settextposition( 1,62); _outtext("ID /");
        _settextposition( 2,60); _outtext("COMMENTS");

for (x=4; x<74; x++)
                {
                _settextposition(3,x);
                _outtext("-");
                }
        return;
} scrn3txt()         /* dock activity screen */
{
        _settextcolor(15);
        _settextposition( 1,28); _outtext("FOR DOCK POSITION:     ");
        _settextcolor(11);
        _settextposition( 3,21); _outtext("EVENT");
        _settextposition( 3,34); _outtext("ACTIVITY");
        _settextposition( 3,50); _outtext("TIME");

for (x=20; x<55; x++)
                {
                _settextposition(4,x);
                _outtext("-");
                }
```

© 1989 RITE HITE CORPORATION

```
        return;
    } scrn4Atxt()         /* dock report screen (montype 1) */
{
        _settextcolor(11);
        _settextposition( 1, 7); _outtext("DOCK");
        _settextposition( 2, 5); _outtext("POSITION");

_settextposition( 1,37); _outtext("TOTAL");
        _settextposition( 2,35); _outtext("LOAD TIME");

for (x=4; x<45; x++)
                {
                _settextposition(3,x);
                _outtext("-");
                }

_settextposition( 1,51); _outtext("SUMMARY DATE:");
        _settextposition( 3,51); _outtext("ACTIVITY HOURS:");

_settextcolor(15);
        if (scnNumb == 6)

© 1989 RITE HITE CORPORATION

{
                _settextposition(2,65);  _outtext("-");
                }
        return;
} scrn4txt()          /* dock report screen (montype 2) */
{
        _settextcolor(11);
        _settextposition( 1, 7); _outtext("DOCK");
        _settextposition( 2, 5); _outtext("POSITION");

_settextposition( 1,21); _outtext("TOTAL");
        _settextposition( 2,18); _outtext("IN DOOR TIME");

_settextposition( 1,37); _outtext("TOTAL");
        _settextposition( 2,35); _outtext("LOAD TIME");

for (x=4; x<45; x++)
                {
                _settextposition(3,x);
                _outtext("-");
                }

_settextposition( 1,51); _outtext("SUMMARY DATE:");
        _settextposition( 3,51); _outtext("ACTIVITY HOURS:");

_settextcolor(15);
        if (scnNumb == 6)
                {
                _settextposition(2,65);  _outtext("-");
                }
        return;
} scrn10txt()         /* dok monitor authorization screen */
{
        _settextcolor(12);
        _settextposition( 2,16); _outtext("*** FOR USE BY AUTHORIZED PERSONNEL ONLY ***");
        _settextposition( 5,18); _outtext("*** HIT 'ESC' THEN 'F1' TO TERMINATE ***");
        return;
}
```

```
       setup()                /* dok monitor set up screen */
              {
50            scnNumb = 11;
              _settextwindow(3,1,24,80);
              _clearscreen(_GWINDOW);
              drawtextbox(4,1,23,80,7,setupscn);
              _settextcolor(11);
55            _settextposition( 3,24); _outtext("NUMBER OF DOCK POSITIONS:");
              _settextposition( 6,19); _outtext("DOK MONITOR (R) TYPE (1 or 2):");
              _settextposition(13,21); _outtext("*** PROGRAM MUST BE RESTARTED  ***");
              _settextposition(14,21); _outtext("***  IF ANY CHANGES ARE MADE    ***");
              setFlag = FALSE;
60            retFlag = 0;
              editFlag = TRUE;
              edit();
              return;
              }
65

©1989 RITE HITE CORPORATION
0
 docktxt()
       {
       if (dockQty > 14)
              {
5             _settextwindow(9,2,22,79);
              _clearscreen(_GWINDOW);
              _settextcolor(15);
              for (x=dockLo, y=1; x<dockHi; x++, y++)
                     {
10                   _settextposition( y, 9);
                     sprintf(buffer,"%2u",x);
                     _outtext(buffer);
                     _settextposition( y,55); _outtext("                       ");
                     }
15            }
       else
              {
              _settextwindow(9,2,22,79);
              _clearscreen(_GWINDOW);
20            _settextcolor(15);
              for (x=dockLo, y=1; x<dockQty+1; x++, y++)
                     {
                     _settextposition( y, 9);
                     sprintf(buffer,"%2u",x);
25                   _outtext(buffer);
                     _settextposition( y,55); _outtext("                       ");
                     }
              pageQty = 1;
              }
30     return;
       }
35 setupval(unsigned int pNum)      /* display ID & Comments on screen 2 */
       {
       int line,index,y;

_settextcolor(15);
40     y=8;
       setPos(0,y,55);
       for (line=0; line<14; line++)
              {
              for (index=0; index<23; index++)
45                   printf("%c",id[pNum][line][index]);
              setPos(0,++y,55);
              }
       return;
       }
50
```

```
dsplyD()        /* set up current date */
        {
        char buffer [9];

_strdate(buffer);
        _settextposition(1,65); _outtext(buffer);

return;
        } struct tm *newtime;
time_t aclock;

©1989 RITE HITE CORPORATION dsplyDT()       /* display date and time */
        {
        char buffer[30];
        _settextwindow(1,1,25,80);
        time(&aclock);
        newtime = localtime(&aclock);
        _settextcolor(9);
        sprintf(buffer,"%s",asctime(newtime));
        _settextposition(1,55); _outtext(buffer);
        return;
        } drawtextbox(int r1, int c1, int r2, int c2, int color, char *label)
        {
        _settextwindow(1,1,25,80);
        _settextcolor(color);
        for (row=r1+1; row<r2; row++)
                {
                _settextposition(row,c1);
                _outtext("\x0b3");
                _settextposition(row,c2);
                _outtext("\x0b3");
                }
        for (column=c1+1; column<c2; column++)
                {
                _settextposition(r1,column);
                _outtext("\x0c4");
                _settextposition(r2,column);
                _outtext("\x0c4");
                }
        _settextposition(r1,c1);
        _outtext("\x0da");
        _settextposition(r2,c1);
        _outtext("\x0c0");
        _settextposition(r1,c2);
        _outtext("\x0bf");
        _settextposition(r2,c2);
        _outtext("\x0d9");

_settextcolor(color+8);
        _settextposition(r1,c1+((c2-c1)-strlen(label))/2);
        _outtext(label);
        _settextwindow(r1+2,c1+2,r2-1,c2-1);
        return;
        }

/* EDITOR1.c   4/18/89 */

/* COPYRIGHT 1989 BY RITE HITE */ include<graph.h>
include<stdlib.h>
```

```c
#include<string.h>
include<math.h> define TRUE 1
define FALSE 0

/*************** PROCEDURE DECLARATIONS ****************/
void edit(void);
void placeCursor(unsigned int,unsigned int);
void eraseCursor(unsigned int,unsigned int);

©1989 RITE HITE CORPORATION

/*************** EXTERNAL VARIABLE DECLARATIONS ***************/
extern unsigned int editFlag;
extern unsigned int key;
extern unsigned int edchar;
extern unsigned int scnNumb;
extern unsigned char edbuf[30];
extern unsigned char prompt1[];
extern unsigned char prompt2[];
extern unsigned char prompt3[2][30];
extern unsigned char prompt4[];
extern unsigned char prompt5[];
extern unsigned char prompt6[];
extern unsigned char id[20][15][30];
extern unsigned char dokpos[];
extern double dockQty;
extern unsigned int pageQty;
extern unsigned int chnQty;
extern unsigned char sumdate[2][9];
extern unsigned int yPos[16];
extern unsigned int page;
extern unsigned char docks[2][4];
extern char quantclear[];
extern char posclear[];
extern char password[];
extern char passclear[];
extern unsigned int montype;
extern unsigned int chkFlag;
extern unsigned int passFlag;
extern unsigned int setFlag;
extern unsigned int quantFlag;
unsigned int charFlag;

unsigned int retFlag;
unsigned int pcounter;
char buff[10];
char maxdock[] = "40";
char maxquant[] = "140";
char passwd[] = "102555";

void edit()
{
        static unsigned int labLine;
        unsigned int index;

if ( editFlag == 1 )                    /* edit setup */
                {
                editFlag++;
                charFlag = 0;
                labLine = 0;
                pcounter = 0;
                setPos(0,23,0);
                putACh(0,' ',112,79);
                placeCursor(labLine,scnNumb);
                return;
                } if ((key & 0xFF) == 0)                  /* keyboard processing routine */
                {
```

```
                    switch (scnNumb)
                        {
                        case 2:
                            key = key >> 8;
                            switch (key)
                                {
                                case 0x48:      /* up arrow */
                                    if (labLine > 0 )
```

©1989 RITE HITE CORPORATION

```
                                        {
                                        eraseCursor(labLine,scnNumb);
                                        labLine--;
                                        placeCursor(labLine,scnNumb);
                                        }
                                    break;
                                case 0x50:      /* down arrow */
                                    if (labLine < 13)
                                        {
                                        eraseCursor(labLine,scnNumb);
                                        labLine++;
                                        placeCursor(labLine,scnNumb);
                                        }
                                    break;
                                }
                        }
            else
                {
                key = key & 0xFF;
                switch (key)
                    {
                    case 0x0D:      /* return/enter */
                        switch (scnNumb)
                            {
                            case 2:
                                for ( index = 0; index < 23; index++)
                                    id[page][labLine][index] = edbuf[index];
                                _settextposition( yPos[labLine]+1,56);
                                _settextcolor(15);
                                sprintf(buff,"%s",&id[page][labLine][0]);
                                _outtext(buff);
                                erasecursor(labLine,scnNumb);
                                setPos(0,23,0);
                                putACh(0,' ',7,79);
                                editFlag = FALSE;
                                break;
                            case 3:
                                for ( index = 0; index < 3; index++)
                                    dokpos[index] = edbuf[index];
                                chkdock();
                                if (chkFlag == 1)
                                    {
                                    printf("\a");
                                    for (index=0; index<3; index++)
                                        dokpos[index] = posclear[index];
                                    placeCursor(labLine,scnNumb);
                                    break;
                                    }
                                setPos(0,5,48);
                                printf("%s",&dokpos[0]);
                                erasecursor(labLine,scnNumb);
                                setPos(0,23,0);
                                putACh(0,' ',7,79);
                                editFlag = FALSE;
                                activity();
                                displayact();
                                break;
                            case 6:
                                if (retFlag == 0)
                                    {
                                    for ( index = 0; index < 8; index++)
```

©1989 RITE HITE CORPORATION

```
                            sumdate[0][index] = edbuf[index];
                        _settextposition( 7,58);
                        _settextcolor(15);
                        sprintf(buff,"%s",&sumdate[0][0]);
                        _outtext(buff);

retFlag = 1;
                        placeCursor(labLine,scnNumb);
                        break;
                        )
                    else if (retFlag == 1)
                        (
                        for ( index = 0; index < 8; index++)
                            sumdate[1][index] = edbuf[index];
                        _settextposition( 7,69);
                        _settextcolor(15);
                        sprintf(buff,"%s",&sumdate[1][0]);
                        _outtext(buff);
                        erasecursor(labLine,scnNumb);
                        setPos(0,23,0);
                        putACh(0,' ',7,79);
                        editFlag = FALSE;
                        readtotals();
                        break;
                        )
            case 10:
                    for ( index = 0; index < 7; index++)
                        password[index] = edbuf[index];
                    chkpass();
                    if (passFlag == 1)
                        (
                        pcounter += 1;
                        if (pcounter == 2)
                            (
                            setPos(0,23,0);
                            putACh(0,' ',7,79);
                            setFlag = FALSE;
                            editFlag = FALSE;
                            break;
                            )
                        printf("\a");
                        for (index=0; index<7; index++)
                            password[index] = passclear[index];
                        placeCursor(labLine,scnNumb);
                        break;
                        )
                    setPos(0,23,0);
                    putACh(0,' ',7,79);
                    setFlag = TRUE;
                    editFlag = FALSE;
                    break;
            case 11:
                    if (charFlag == 0)
                        (
                        erasecursor(labLine,scnNumb);
                        setPos(0,23,0);
                        putACh(0,' ',7,79);
                        editFlag = FALSE;
                        break;
                        )
                    if (retFlag == 0)
                        (
                        for ( index = 0; index < 3; index++)
                            docks[0][index] = edbuf[index];
                        chkquant();
                        if (quantFlag == 1)
                            (
                            printf("\a");
                            for (index=0; index<3; index++)
                            docks[0][index] = quantclear[index];
                        placeCursor(labLine,scnNumb);
```

© 1989 RITE HITE CORPORATION

```
                                        _settextposition( 8,52);
                                        _settextcolor(15);
                                        sprintf(buff,"%s",&docks[0][0]);
                                        _outtext(buff);
                                        retFlag = 1;
                                        charFlag = 0;
                                        placeCursor(labLine,scnNumb);
                                        break;
                                        }
                                 else if (retFlag == 1)
                                        {
                                        for ( index = 0; index < 1; index++)
                                                docks[1][index] = edbuf[index];
                                        montype = atoi(docks[1]);
                                        wsetup();
                                        dockQty = atof(docks[0]);
                                        chnQty = dockQty * montype;
                                        _settextposition(11,52);
                                        _settextcolor(15);
                                        sprintf(buff,"%s",&docks[1][0]);
                                        _outtext(buff);
                                        erasecursor(labLine,scnNumb);
                                        setPos(0,23,0);
                                        putACh(0,' ',7,79);
                                        editFlag = FALSE;
                                        break;
                                        }
                                 }
                        break;
                case 0x08:      /* backspace */
                        if ( edchar > 0 )
                                {
                                --edchar;
                                setPos(0,23,28+edchar);
                                putACh(0,'_',240,1);
                                setPos(0,23,29+edchar);
                                putACh(0,' ',112,1);
                                edbuf[edchar] = ' ';
                                }
                        break;
                case 0x1B:      /* escape */
                        erasecursor(labLine,scnNumb);
                        setPos(0,23,0);
                        putACh(0,' ',7,79);
                        editFlag = FALSE;
                        break;
                default:        /* alphanumeric or garbage */
                        charFlag = 1;
                        switch (scnNumb)
                                {
                                case 2:
                                        if ( edchar < 23 )
                                                {
                                                if ((key >= 97) && (key <=122))
                                                        key -= 32;
                                                if (((key >= 48) || (key <= 57)) ||
                                                   ((key >= 65) && (key <= 90)) ||
                                                   ((key == 45) || (key == 32)))
                                                        {
                                                        edbuf[edchar] = key;
                                                        setPos(0,23,28+edchar);
                                                        edchar++;
                                                        putACh(0,key,112,1);
```

© 1989 RITE HITE CORPORATION

```
                              setPos(0,23,28+edchar);
                              putACh(0,'_',240,1);
                              return;
                              } else
                              break;
                        }
                  printf("\007");
                  break;
            case 3:
                  if ( edchar < 3 )
                        {
                        if ((key < 48) || (key > 57))
                              break;
                        else
                              {
                              edbuf[edchar] = key;
                              setPos(0,23,28+edchar);
                              edchar++;
                              putACh(0,key,112,1);
                              setPos(0,23,28+edchar);
                              putACh(0,'_',240,1);
                              return;
                              }
                        }
                  printf("\007");
                  break;
            case 6:
                  if ( edchar < 8 )
                        {
                        if ((key < 47) || (key > 57))
                              break;
                        else
                              {
                              edbuf[edchar] = key;
                              setPos(0,23,28+edchar);
                              edchar++;
                              putACh(0,key,112,1);
                              setPos(0,23,28+edchar);
                              putACh(0,'_',240,1);
                              return;
                              }
                        }
                  printf("\007");
                  break;
            case 10:
                  if ( edchar < 6 )
                        {
                        if ((key >= 97) && (key <=122))
                              key -= 32;
                        if (((key >= 48) || (key <= 57)) ||
                           ((key >= 65) && (key <= 90)) ||
                           ((key == 45) || (key == 32)))
                              {
                              edbuf[edchar] = key;
                              setPos(0,23,28+edchar);
                              edchar++;
                              putACh(0,'*',112,1);
                              setPos(0,23,28+edchar);
                              putACh(0,'_',240,1);
                              return;
                              }
                        }
                  printf("\007");
                  break;
            case 11:
                  if ( retFlag == 0)
```

©1989 RITE HITE CORPORATION

```
                                                                {
                                                                if ( edchar < 3 )
                                                                        {
                                                                        if ((key < 48) || (key > 57))
                                                                                break;
                                                                        else
                                                                                {
                                                                                edbuf[edchar] = key;
                                                                                setPos(0,23,28+edchar);
                                                                                edchar++;
                                                                                putACh(0,key,112,1);
                                                                                setPos(0,23,28+edchar);
                                                                                putACh(0,'_',240,1);
                                                                                return;
                                                                                }
                                                                        }
                                                                printf("\007");
                                                                break;
                                                                }
                                                        else if ( retFlag == 1)
                                                                {
                                                                if ( edchar < 1 )
                                                                        {
                                                                        if ((key < 49) || (key > 50))
                                                                                break;
                                                                        else
                                                                                {
                                                                                edbuf[edchar] = key;
                                                                                setPos(0,23,28+edchar);
                                                                                edchar++;
                                                                                putACh(0,key,112,1);
                                                                                setPos(0,23,28+edchar);
                                                                                putACh(0,'_',240,1);
                                                                                return;
                                                                                }
                                                                        }
                                                                printf("\007");
                                                                break;
                                                                }
                                        }
                                break;
                                }
                        }
        return;
        } void placeCursor(unsigned int line,unsigned int screen)
  {
int z,x;

switch (screen)
                {
                case 2:
                        setPos(0,yPos[line],54);
                        putACh(0,'\x10',143,1);
                        for (z=0; z<=24; z++)
                                edbuf[z] = ' ';
                        edchar = 0;
                        setPos(0,23,1);
                        printf("%-55s",&prompt1[0]);
                        setPos(0,23,28);
                        putACh(0,'_',240,1);
                        break;
                case 3:
                        for (z=0; z<=18; z++)
                                edbuf[z] = ' ';
```

```
                    edchar = 0;
                    setPos(0,23,1);
                    printf("%-40s",&prompt2[0]);
                    setPos(0,23,28);
```

©1989 RITE HITE CORPORATION

```
                    putACh(0,'_',240,1);
                    break;
            case 6:
                    if (retFlag == 0)
                            {
                            for (z=0; z<=18; z++)
                                    edbuf[z] = ' ';
                            edchar = 0;
                            setPos(0,23,1);
                            printf("%-40s",&prompt3[0][0]);
                            setPos(0,23,28);
                            putACh(0,'_',240,1);
                            break;
                            }
                    else if (retFlag == 1)
                            {
                            for (z=0; z<=18; z++)
                                    edbuf[z] = ' ';
                            edchar = 0;
                            setPos(0,23,1);
                            printf("%-40s",&prompt3[1][0]);
                            setPos(0,23,28);
                            putACh(0,'_',240,1);
                            break;
                            }
                    break;
            case 10:
                    for (z=0; z<=18; z++)
                            edbuf[z] = ' ';
                    edchar = 0;
                    setPos(0,23,1);
                    printf("%-40s",&prompt4[0]);
                    setPos(0,23,28);
                    putACh(0,'_',240,1);
                    break;
            case 11:
                    if (retFlag == 0)
                            {
                            for (z=0; z<=18; z++)
                                    edbuf[z] = ' ';
                            edchar = 0;
                            setPos(0,23,1);
                            printf("%-40s",&prompt5[0]);
                            setPos(0,23,28);
                            putACh(0,'_',240,1);
                            break;
                            }
                    else if (retFlag == 1)
                            {
                            for (z=0; z<=18; z++)
                                    edbuf[z] = ' ';
                            edchar = 0;
                            setPos(0,23,1);
                            printf("%-40s",&prompt6[0]);
                            setPos(0,23,28);
                            putACh(0,'_',240,1);
                            break;
                            }
                    break;
            }
    return;
}
```

```
void eraseCursor(unsigned int line,unsigned int screen)
{
        switch (screen)

© 1989 RITE HITE CORPORATION

{
                case 2:
                        setPos(0,yPos[line],54);
                        putTty(0,' ',3);
                        setPos(0,yPos[line],55);
                        printf("%s",&id[page][line][0]);
                        break;
                case 3:
                        setPos(0, 5,47);
                        putTty(0,' ',3);
                        setPos(0, 5,48);
                        printf("%s",&dokpos[0]);
                        break;
                case 6:
                        if (retFlag == 0)
                                {
                                setPos(0, 6,55);
                                putTty(0,' ',3);
                                setPos(0, 6,57);
                                printf("%s",&sumdate[0][0]);
                                break;
                                }
                        else if (retFlag == 1)
                                {
                                setPos(0, 6,67);
                                putTty(0,' ',3);
                                setPos(0, 6,68);
                                printf("%s",&sumdate[1][0]);
                                break;
                                }
                        break;
                case 10:
                        setPos(0, 5,47);
                        putTty(0,' ',3);
                        setPos(0, 5,48);
                        printf("%s",&password[0]);
                        break;
                case 11:
                        if (retFlag == 0)
                                {
                                setPos(0, 7,50);
                                putTty(0,' ',3);
                                setPos(0, 7,51);
                                printf("%s",&docks[0][0]);
                                break;
                                }
                        else if (retFlag == 1)
                                {
                                setPos(0,10,50);
                                putTty(0,' ',3);
                                setPos(0,10,51);
                                printf("%s",&docks[1][0]);
                                break;
                                }
                        break;
                }
        return;
} unsigned int chkFlag;
chkdock()
```

```
        {
        int val1;
        chkFlag = 0;
```

© 1989 RITE HITE CORPORATION

```
        val1 = atoi(dokpos);
        if (val1 > dockQty)
                chkFlag = 1;
        return;
        } unsigned int passFlag;
chkpass()
        {
        double val1,val2;

val1 = atof(passwd);
        val2 = atof(password);
        if (val1 == val2)
                {
                passFlag = 0;
                return;
                }
        else
                passFlag = 1;
        return;
        } unsigned int quantFlag;
chkquant()
        {
        double val1,val2;

val1 = atof(docks[0]);
        val2 = atof(maxquant);
        if (val1 > val2)
                {
                quantFlag = 1;
                return;
                }
        else    {
                quantFlag = 0;
                dockQty = val1;
                pageQty = ceil(dockQty / 14);
                }
        return;
        }

/* STATUS1.c    4/17/89 */

/* COPYRIGHT 1989 BY RITE HITE */ include<graph.h>
include<stdlib.h>
include<math.h> unsigned int statusFlag;

extern unsigned int page;
extern char id[20][15][30];
extern char idclear[];
unsigned int truckFlag[150];
extern int events;
extern unsigned int chn;
extern unsigned int chnQty;
```

```
extern unsigned int montype;
extern int openFlag[120];
```

© 1989 RITE HITE CORPORATION

```c
extern int dokbit[120];
extern int doknum[150];
extern int doktime[150];
extern int doktype[150];
extern int locset[120];
extern int inset[120];
extern int loctot[120];
extern int intot[120];
extern int mintime;
extern double dockQty;
extern unsigned int scnNumb;
int type;
int update;
int eventtot;
int loadtime;
int doortime;

status()                        /* display status on screen 2 */
{
    int linepos, clearpos, dok, event, index;
    int initime = 0;

if (statusFlag == 1)
        {
        statusFlag++;
        return;
        } if (events > eventtot)
        {
        for (event=eventtot; event<events; event++)
            {
            dok = doknum[event];
            type = doktype[event];
            switch(type)
                {
                case 0:
                    if (montype == 1)
                        {
                        truckFlag[dok] = 0;
                        doktype[event] = 2;
                        }
                    else if (montype == 2)
                        truckFlag[dok] = 3;
                    if (locset[dok] != 0)
                        {
                        loctot[dok] = loctot[dok] + doktime[event] - locset[dok];
                        loadtime = loadtime + doktime[event] - locset[dok];
                        writetotals();
                        locset[dok] = 0;
                        }
                    locset[dok] = 0;
                    break;
                case 1:
                    truckFlag[dok] = 2;
                    locset[dok] = doktime[event];
                    break;
                case 2:
                    truckFlag[dok] = 0;
                    if (inset[dok] != 0)
                        {
                        intot[dok] = intot[dok] + doktime[event] - inset[dok];
                        doortime = doortime + doktime[event] - inset[dok];
                        writetotals();
                        inset[dok] = 0;
```

```
                                )
                        inset[dok] = 0;

© 1989 RITE HITE CORPORATION break;
                case 3:
                        truckFlag[dok] = 1;
                        inset[dok] = doktime[event];
                        break;
                }
        }
        eventtot = events;
} if (scrNumb == 2)
{
        for (chn=0; chn<chnQty; chn++)
        {
                if (chn < dockQty)
                {
                        linepos = chn - (14 * (page - 1)) + 9;
                        clearpos = linepos - 9;

if (linepos >= 9 && linepos <= 22)
                        {
                                switch (truckFlag[chn])
                                {
                                        case 0:            /* open */
                                                _settextcolor(15);
                                                _settextposition(linepos,18);   _outtext("OPEN              ");
                                                if (openFlag[chn] == 1)
                                                {
                                                        _settextposition(linepos,56);   _outtext("              ");
                                                        for (index=0; index<23; index++)
                                                                id[page][clearpos][index] = idclear[index];
                                                        openFlag[chn] = 0;
                                                }
                                                break;
                                        case 1:            /* truck in door */
                                                _settextcolor(9);
                                                _settextposition(linepos,18);   _outtext("TRUCK IN DOOR   ");
                                                break;
                                        case 2:            /* truck locked */
                                                _settextcolor(10);
                                                _settextposition(linepos,18);   _outtext("TRUCK LOCKED    ");
                                                break;
                                        case 3:            /* truck released */
                                                _settextcolor(14);
                                                _settextposition(linepos,18);   _outtext("TRUCK RELEASED ");
                                                convhr(loctot[chn],50,linepos);
                                                break;
                                }
                                if (montype == 1)
                                {
                                        switch (truckFlag[chn])
                                        {
                                                case 0:            /* open */
                                                        _settextposition(linepos,50);   _outtext("       ");
                                                        break;
                                                case 2:            /* truck locked */
                                                        getmin();
                                                        update = mintime - locset[chn];
                                                        convhr(update,50,linepos);
                                                        break;
                                        }
                                }
                                else if (montype == 2)
                                {
                                        switch (truckFlag[chn])
                                        {
```

© 1989 RITE HITE CORPORATION

```
                                    case 0:          /* open */
                                        _settextposition(linepos,39);   _outtext("    ");
                                        _settextposition(linepos,50);   _outtext("    ");
                                        break;
                                    case 1:          /* truck in door */
                                        getmin();
                                        update = mintime - inset[chn];
                                        convhr(update,39,linepos);
                                        break;
                                    case 2:          /* truck locked */
                                        getmin();
                                        update = mintime - inset[chn];
                                        convhr(update,39,linepos);
                                        getmin();
                                        update = mintime - locset[chn];
                                        convhr(update,50,linepos);
                                        break;
                                    case 3:          /* truck released */
                                        getmin();
                                        update = mintime - inset[chn];
                                        convhr(update,39,linepos);
                                        break;
                                    }
                                }
                            }
                        }
                    }
            return;
            }

/* DOKMON1.c    4/17/89 */

/* COPYRIGHT 1989 BY RITE HITE */ include<graph.h>
include<stdlib.h>
#include<time.h>
#include<math.h>
#include<stdio.h>
#include<process.h>
#include"pcihead.h"
#include"26s.h"

int mintime;
    unsigned int min;
    unsigned int hr;
    extern int adata;
    int events;
    unsigned int chx;

extern unsigned int chn;
    extern unsigned int chnQty;
    extern unsigned int montype;
    int openFlag[120];
    extern int dokbit[120];
    extern int doknum[150];
    extern int doktime[150];
    extern int doktype[150];
    extern int loctot[120];
    extern char buffer[5];
    extern int actstart;

dokmon()
    {

©1989 RITE HITE CORPORATION for (chn=0; chn<chnQty; chn++)
            {
            adata =! read_ch(_DIBT,chn);
            error_routine("error on read");
            if (dokbit[chn] != adata)
                {
                if (events == 0)
                    {
                    getmin();
                    actstart = mintime;
```

```
                    )
            dokbit[chn] = adata;
            doknum[events] = chn / montype;
            getmin();
            doktime[events] = mintime;
            if (montype == 2)
                    adata = adata + (chn%2) * 2;
            doktype[events] = adata;
            if (adata==0 && montype==1)
                    openFlag[chn] = 1;
            else if (adata==2 && montype==2)
                    openFlag[chn/2] = 1;
            store();
            events++;
            }
                )
        return;
        } getmin()
        {
        struct tm *newtime;
        time_t long_time;

time(&long_time);
        newtime = localtime(&long_time);

mintime = (newtime -> tm_hour)*60 + (newtime -> tm_min);
        return;
        } convhr(int tminutes,int xx,int yy)
        {
        min = tminutes % 60;
        hr  = tminutes / 60;
        _settextcolor(15);
        _settextposition(yy,xx);
        if (min >= 10)
                {
                sprintf(buffer,"%u:%u",hr,min);
                _outtext(buffer);
                }
        else
                {
                sprintf(buffer,"%u:0%u",hr,min);
                _outtext(buffer);
                }
        return;
        }

/* WSETUP.c    3/30/89 */
/* write # of docks and dok monitor type to disk file (SETDATA.TXT) */ include<stdio.h>

ⓒ1989 RITE HITE CORPORATION extern unsigned char docks[2][4];

char flname[] = ("SETDATA.TXT");

wsetup()
        {
        unsigned int i;
        char c;
```

```
        FILE *f1,*fopen();
        f1 = fopen(flname,"w");

for (i=0; i<3; i++)
                {
                c = docks[0][i];
                putc(c,f1);
                }
        putc(',',f1);

for (i=0; i<1; i++)
                {
                c = docks[1][i];
                putc(c,f1);
                }
        putc(',',f1);

fclose(f1);
        return;
        }

/* RSETUP.c    4/6/89 */
/* reads # of docks and dok monitor type from disk file (SETDATA.TXT) */

/* COPYRIGHT 1989 BY RITE HITE */ include<stdio.h> extern unsigned char docks[2][4];

extern char flname[];

rsetup()
        {
        unsigned int i;
        char c;

FILE *f1,*fopen();
        f1 = fopen(flname,"r");

for (i=0; i<3; i++)
                {
                if ((c = getc(f1)) == ',')
                        break;
                else
                        docks[0][i] = c;
                } c = getc(f1);
        c = getc(f1);
        docks[1][0] = c;

©1989 RITE HITE CORPORATION fclose(f1);
        return;
        }

/* ACTIVITY.c   4/6/89 */
```

```
/* COPYRIGHT 1989 BY RITE HITE */ include<graph.h>
include<conio.h>
#include<stdlib.h>
#include<stdio.h>
include<math.h> extern unsigned int montype;
extern unsigned int evntpgQty;
extern unsigned int page;
extern int events;
extern int doknum[150];
extern int doktime[150];
extern int doktype[150];
extern unsigned char dokpos[];
int act[150];
int acttime[150];
int cntr;

activity()
        {
        int dock,chan,event;

cntr = 0;
        dock = atoi(dokpos);
        chan = dock - 1;
        for (event=0; event<events; event++)
                {
                if (doknum[event] == chan)
                        {
                        act[cntr] = doktype[event];
                        acttime[cntr] = doktime[event];
                        cntr++;
                        }
                }
        evntpgQty = cntr / 13;
        if ((cntr % 13) > 0)
                evntpgQty += 1;
        return;
        } displayact()
        {
        int event,linepos;
        char buffer[30];

_settextwindow(10,2,22,79);
        _clearscreen(_GWINDOW);

for (event=0; event<cntr; event++)
                {
                linepos = event - (13 * (page - 1)) + 1;
```

©1989 RITE HITE CORPORATION

```
                if (linepos >= 1 && linepos <=13)
                        {

_settextcolor(15);
                        sprintf(buffer,"%2d",event+1);
                        _settextposition(linepos,24);    _outtext(buffer);
                        switch(act[event])
                                {
                                case 0:
```

```
                                    _settextposition(linepos,32);    _outtext("TRUCK RELEASED");
                                    break;
                            case 1:
                                    _settextposition(linepos,32);    _outtext("TRUCK LOCKED   ");
                                    break;
                            case 2:
                                    _settextposition(linepos,32);    _outtext("OPEN           ");
                                    break;
                            case 3:
                                    _settextposition(linepos,32);    _outtext("TRUCK IN DOOR ");
                                    break;
                            }
                    convhr(acttime[event],51,linepos);

}
            }
       return;
       }

/* REPORT.c    4/17/89  */

/* COPYRIGHT 1989 BY RITE HITE */ include<graph.h>
   #include<stdlib.h>
   #include<math.h> define TRUE 1 extern unsigned int montype;
   extern unsigned int chn;
   extern unsigned int chnQty;
   extern double dockQty;
   extern int actmin;
   extern unsigned int page;
   extern int intot[120];
   extern int loctot[120];
   extern int doortime;
   extern int loadtime;
   extern unsigned int extrapage;
   double utilLT;
   double utilIDT;

report()                 /* display dock report */
           {
           int linepos;

for (chn=0; chn<chnQty; chn++)
                   {
                   if (chn < dockQty)
                           {
                           linepos = chn - (14 * (page - 1)) + 1;
                           if (linepos >= 1 && linepos <= 14)
                                   {
                                   if (montype == 1)
                                           convhr(loctot[chn],38,linepos);
                                   else if (montype == 2)
```

©1989 RITE HITE CORPORATION

```
                                           {
                                           convhr(intot[chn],22,linepos);
                                           convhr(loctot[chn],38,linepos);
                                           }
                                   }
                           }
                   }
           return;
           }
```

```
utildisp()
        {
        int linepos, x;

if (actmin == 0)
                {
                utilLT = 0;
                utilIDT = 0;
                }
        else
                {
                utilLT = (loadtime / (dockQty * actmin)) * 100;
                utilIDT = (doortime / (dockQty * actmin)) * 100;
                } if (extrapage != TRUE)
                {
                linepos = dockQty - (14 * (page - 1)) + 1;
                for (x=5; x<46; x++)
                        {
                        _settextposition(linepos,x);
                        _outtext("-");
                        }
                }
        else if (extrapage == TRUE)
                linepos = 0;

if (montype == 1)
                {
                _settextposition(linepos+1,6);  _outtext("TOTAL:");
                convhr(loadtime,38,linepos+1);
                _settextposition(linepos+2,6);  _outtext("% UTILIZATION:           ");
                _settextposition(linepos+2,38);
                printf("%3.1f",utilLT);
                }
        else if (montype == 2)
                {
                _settextposition(linepos+1,6);  _outtext("TOTALS:");
                convhr(doortime,22,linepos+1);
                convhr(loadtime,38,linepos+1);
                _settextposition(linepos+2,6);  _outtext("% UTILIZATION:           ");
                _settextposition(linepos+2,22);
                printf("%3.1f",utilIDT);
                _settextposition(linepos+2,38);
                printf("%3.1f",utilLT);
                } return;
        }
```

/* STORE.c    4/18/89 */

© 1989 RITE HITE CORPORATION

0/* write event data to disk file (TMMMDDYY) */

/* COPYRIGHT 1989 BY RITE HITE */

```
#include<stdlib.h>
#include<stdio.h>
#include<time.h>
#include<math.h>
```

```c
    extern double dockQty;
    extern int doknum[150];
    extern int doktime[150];
    extern int doktype[150];
    extern int loctot[120][4];
    extern int intot[120][4];
    extern int totalLT[140][4];
    extern int totalIDT[140][4];
    extern char sumdate[2][9];
    extern int events;

unsigned int tempdate;
    long startd;
    long endd;
    char filname2[8];
    FILE *f2,*fopen();
char filname3[8];

store()
            {
            char c;

c = doknum[events];
            putc(c,f2);

return;
            } writetotals()
            {
            int i,j;
            char c;

FILE *f3,*fopen();
            f3 = fopen(filname3,"w");

for (i=0; i<dockQty; i++)
                    {
                    for (j=0; j<4; j++)
                            {
                            c = intot[i][j];
                            putc(c,f3);
                            }
                    for (j=0; j<4; j++)
                            {
                            c = loctot[i][j];
                            putc(c,f3);
                            }
                    } fclose(f3);
            return;
            } readtotals()
            {

©1989 RITE HITE CORPORATION int i,j,k;
            char c;

FILE *f3,*fopen();
            f3 = fopen(filname3,"r");

for (i=0; i<8; i++)
                    {
                    c = sumdate[0][i];
```

```
            k = atoi(c);
            setPos(0,9,45);    printf("%c  %d",c,k);
            } setPos(0,16,45);    printf("%d  %d",startd,endd);

for (i=0; i<dockQty; i++)
            {
            for (j=0; j<4; j++)
                {
                c = getc(f3);
                k = atoi(c);
                totalIDT[i][j] = k;
                }
            for (j=0; j<4; j++)
                {
                c = getc(f3);
                k = atoi(c);
                totalLT[i][j] = k;
                }
            } fclose(f3);
        return;
        } setfilname()
        {
        struct tm *newdate;
        time_t long_date;

time(&long_date);
        newdate = localtime(&long_date);
        tempdate = (newdate -> tm_mon)*10000 + (newdate -> tm_mday)*100 + (newdate -> tm_year);
        tempdate += 10000;

if ((newdate -> tm_mon) <= 8)
            {
            sprintf(filname2,"TM0%u",tempdate);
            sprintf(filname3,"DM0%u",tempdate);
            }
        else
            {
            sprintf(filname2,"TM%u",tempdate);
            sprintf(filname3,"DM%u",tempdate);
            } f2 = fopen(filname2,"w");
        return;
        }
```

© 1989 RITE HITE CORPORATION

I claim:

1. A remote monitoring system for continually monitoring a truck docking facility which includes a plurality of truck loading/unloading positions and locking means operable at each position for restraining a truck against movement during loading/unloading operations, said monitoring system comprising: lock condition sensing means for substantially continually developing locked and unlocked signals respectively corresponding to locked and unlocked conditions of said locking means at each of said truck loading/unloading positions; data processing means; keyboard means coupled to said data processing means for control of operation thereof; a monitor coupled to said data processing means and including a display screen; and dedicated coupling means for coupling said data processing means to said lock condition sensing means, said data processing means being operable to continually process signals from said lock condition sensing means and to display on said screen a plurality of types of data including current lock condition data which shows the current status of each of said lock condition sensing means and load time data showing the time of development of each locked signal.

2. A remote monitoring system as defined in claim 1, further including truck sensing means for substantially continually developing empty and in-door signals respectively corresponding to the existence and non-existence of a truck at each of said truck loading/unloading positions, and dedicated coupling means for coupling said truck sensing means to said data processing means, said data processing means being also operable to continually process signals from said truck sensing means and to display on said screen data which shows the status of said empty and in-door signals and the time of development of each in-door signal.

3. A method of substantially continually and remotely monitoring operations at a multi-position truck docking facility which includes a locking device at each position operable from an unlocked state to a locked state for restraining a vehicle against movement during loading/unloading operations, said method comprising the steps of: recording each change of state of said locking device, selectively producing tables of information including tables showing the present status of the locking devices at all positions, and tables of information showing the duration of time in which each locked device has been in a locked state.

4. A method as defined in claim 3, wherein a sensor device is provided at each position and operable from one state to another in response to the presence of a vehicle at the station, said method further comprising the steps of recording each change of state of said sensing means and selectively producing indications on said table of information showing the present status of said sensing means and showing the duration of time in which each sensor device has been in a state indicating the presence of a vehicle.

5. A remote monitoring system for continually monitoring a truck docking facility which includes a plurality of truck loading/unloading positions and locking means operable at each position for restraining a truck against movement during loading/unloading operations, said monitoring system comprising: individual lock condition sensing means for substantially continually developing locked and unlocked signals respectively corresponding to locked and unlocked conditions of said locking means at each of said truck loading/unloading positions; data processing means; keyboard means coupled to said data processing means for controlling operation thereof; a monitor coupled to said data processing means and including a display screen, and dedicated coupling means for coupling said data processing means directly to each of said individual lock condition sensing means, said data processing means being operable to continually and substantially simultaneously process signals from each of said lock condition sensing means and to display on said screen a plurality of types of data including current lock condition data which shows the current status of each of said lock condition sensing means and load time data showing the time of development of each locked signal.

6. A remote monitoring system as defined in claim 5, further including individual truck sensing means for substantially continually developing empty and in-door signals respectively corresponding to the existence and non-existence of a truck at each of said individual truck loading/unloading positions, and dedicated coupling means for coupling each of said truck sensing means directly to said data processing means, said data processing means being also operable to continually and substantially simultaneously process signals from each of said truck sensing means and to display on said screen data showing the status of said empty and in-door signals and the time of development of each in-door signal.

7. A remote monitoring system as defined in claims 2 or 6 wherein said data processing means includes selection means operable to select between display of data received from said lock condition sensing means and display of data received from both said lock condition sensing means and said truck sensing means.

8. A remote monitoring system as defined in claim 2 or 6 further comprising monitoring means adapted to record data for each event that occurs in each of said loading/unloading positions, each said event being a change in said status of one of said positions.

9. A remote monitoring system as defined in claim 8 further comprising means to permanently store said event data.

10. A remote monitoring system as defined in claim 9 further including means to process said event data and generate condensed files and summaries of activities.

11. A remote monitoring system as defined in claim 8 wherein said plurality of types of data display includes dock activity data which displays said events that have occurred in a specified one of said positions over a specified period and the time of development of each said event.

12. A remote monitoring system as defined in claim 8, wherein said plurality of types of data display includes current day data which displays the total in-door and total load times for each of said loading/unloading positions for the day to date, said in-door time being the period between the commencement of one said in-door signal and the subsequent said empty signal and said load time being the period between the commencement of one of said locked signals and the subsequent said unlocked signal.

13. A remote monitoring system as defined in claim 12 wherein said plurality of types of data display additionally includes period summary data which displays the total of said in-door time and the total of said loading time for each of said loading/unloading positions over a specified period.

14. A remote monitoring system as defined claims 2 or 6 wherein said plurality of types of data display include a current status report for each of said loading-/unloading positions.

15. A remote monitoring system as defined in claim 14 wherein said current status report includes the current status of each of said loading/unloading positions; the time since the commencement of an in-door signal for each of the occupied positions; and the loading time for each said position, said loading time being the period between commencement of one locked signal and subsequent unlocked signal.

16. A remote monitoring system as defined in claims 2 or 6 further comprising means to optionally select each of said plurality of types of data for display on said screen.

* * * * *